US006686745B2

(12) United States Patent
Bass

(10) Patent No.: US 6,686,745 B2
(45) Date of Patent: Feb. 3, 2004

(54) APPARATUS AND METHOD FOR ELECTRICAL TESTING OF ELECTRICALLY HEATED PIPE-IN-PIPE PIPELINE

(75) Inventor: Ronald M. Bass, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/910,295

(22) Filed: Jul. 20, 2001

(65) Prior Publication Data

US 2003/0016028 A1 Jan. 23, 2003

(51) Int. Cl.[7] ............................. G01R 31/08; F16L 1/00
(52) U.S. Cl. .................................... 324/522; 405/154.1
(58) Field of Search ......................... 324/642; 405/154.1

(56) References Cited

U.S. PATENT DOCUMENTS

| 972,308 | A | 10/1910 | Williamson | |
|---|---|---|---|---|
| 1,231,202 | A | 6/1917 | Saylor | |
| 2,096,279 | A | 10/1937 | Karcher | 255/28 |
| 2,178,720 | A | 2/1939 | Daniels | 219/47 |
| 2,206,831 | A | 3/1940 | Berthelsen | 74/440 |
| 2,217,857 | A | 4/1940 | Byck | 166/21 |
| 2,224,403 | A | 12/1940 | Lines | 219/39 |
| 2,306,831 | A | 12/1942 | Proctor | 219/39 |
| 2,660,249 | A | 11/1953 | Jakosky | 166/17 |
| 2,678,377 | A | 5/1954 | Justiz | 219/40 |
| 2,714,930 | A | 8/1955 | Carpenter | 166/60 |
| 2,757,738 | A | 8/1956 | Ritchey | 166/39 |
| 2,851,197 | A | 9/1958 | Colton | 222/146 |
| 2,982,354 | A | 4/1961 | Green | 166/60 |
| 3,184,958 | A | 5/1965 | Eaton | 73/40.5 |
| 3,388,724 | A | 6/1968 | Mowell et al. | 138/149 |
| 3,423,570 | A | 1/1969 | Trabilcy | 219/301 |
| 3,432,186 | A | 3/1969 | Braun | 285/53 |
| 3,439,075 | A | 4/1969 | Bauer et al. | 264/45 |
| 3,507,330 | A | 4/1970 | Gill | 166/248 |
| 3,515,837 | A | 6/1970 | Ando | 219/10.49 |

(List continued on next page.)

FOREIGN PATENT DOCUMENTS

| EP | 1070907 | 1/2001 | ........... F16L/59/14 |
|---|---|---|---|
| GB | 2084284 | 7/1982 | ........... F16L/53/00 |
| SU | 569815 | 9/1977 | |
| WO | 103122 | 4/1937 | |
| WO | 1359445 | 4/1972 | ........... F16L/25/00 |
| WO | 1437587 | 3/1974 | ........... F16L/13/10 |
| WO | 1532730 | 10/1976 | ........... F16L/25/01 |

OTHER PUBLICATIONS

"Direct Impedance Heating of Deepwater Flowlines," OTC 11037, May, 1999.

"Cable–Free Electrical Systems for the Oil to Gas Industry," Production Technologies Company, L.L.C., 600 Kenrick, Suite C–30; Houston, Texas 77060, advertisement, Copyright 1996, 6 pp.

"Dunbar in Depth," Offshore Engineer, Dec. 1994, 2 pp.

"Introduction to Direct Heating of Subsea Pipelines," overview byStatoil, Saga Petroleum, CSO Norge, Alcatel, Kabel Norge and EFI, Feb. 1988.

(List continued on next page.)

Primary Examiner—N. Le
Assistant Examiner—Donald M Lair

(57) ABSTRACT

A method and apparatus for electrically testing a pipe-in-pipe pipeline during the construction, installation, commissioning, operation, or dismantling phases of an electrically heated pipe-in-pipe subsea pipeline. One embodiment is directed to a high voltage qualification test of the electrical integrity of a segment of a pipe-in-pipe pipeline. Another embodiment is directed to a method and an apparatus for performing a high voltage pulse test of the electrical integrity of a pipe-in-pipe pipeline. Yet another embodiment of the present invention is directed to a method and an apparatus for performing a low voltage pulse test of the electrical integrity of a pipe-in-pipe pipeline, which may be performed during the operation phase of an electrically heated pipe-in-pipe pipeline.

5 Claims, 12 Drawing Sheets

U.S. PATENT DOCUMENTS

| | | | |
|---|---|---|---|
| 3,547,193 A | 12/1970 | Gill | 166/248 |
| 3,556,218 A | 1/1971 | Talley, Jr. et al. | 166/265 |
| 3,605,888 A | 9/1971 | Crowson et al. | 166/248 |
| 3,614,986 A | 10/1971 | Gill | 166/303 |
| 3,620,300 A | 11/1971 | Crowson | 166/248 |
| 3,630,038 A | 12/1971 | Ando | 61/72.1 |
| 3,642,066 A | 2/1972 | Gill | 166/248 |
| 3,706,872 A | 12/1972 | Trabilcy | 219/300 |
| 3,789,188 A | 1/1974 | Rudbarg | 219/301 |
| 3,859,503 A | 1/1975 | Palone | 219/278 |
| 3,885,595 A | 5/1975 | Gibson et al. | 138/155 |
| 3,933,031 A | 1/1976 | Uhlarik | 73/40.5 R |
| 3,935,632 A | 2/1976 | Maxson | 29/455 R |
| 3,944,262 A | 3/1976 | Stiner et al. | 285/53 |
| 3,958,636 A | 5/1976 | Perkins | 166/248 |
| 3,975,617 A | 8/1976 | Othmer | 219/300 |
| 3,981,181 A | 9/1976 | Ochiai | 73/40.5 R |
| 3,983,360 A | 9/1976 | Offerman | 219/301 |
| 4,010,799 A | 3/1977 | Kern et al. | 166/248 |
| 4,011,652 A | 3/1977 | Black | 29/455 R |
| 4,017,102 A | 4/1977 | Henderson | 285/41 |
| 4,140,179 A | 2/1979 | Kasevich et al. | 166/248 |
| 4,142,093 A | 2/1979 | Offerman | 219/301 |
| 4,319,632 A | 3/1982 | Marr, Jr. | 166/60 |
| 4,401,162 A | 8/1983 | Osborne | 166/248 |
| 4,450,711 A | 5/1984 | Claude | 73/40.5 R |
| 4,496,174 A | 1/1985 | McDonald et al. | 285/53 |
| 4,522,578 A | 6/1985 | Jameson | 425/110 |
| 4,553,023 A | 11/1985 | Jameson et al. | 219/301 |
| 4,590,971 A | 5/1986 | Wenster | 138/149 |
| 4,644,780 A | 2/1987 | Jeter | 73/40.5 |
| 4,645,906 A | 2/1987 | Yagnik et al. | 219/301 |
| 4,667,505 A | 5/1987 | Sharp | 73/40.5 R |
| 4,684,786 A | 8/1987 | Mann et al. | 219/297 |
| 4,716,960 A | 1/1988 | Eastlund et al. | 166/60 |
| 4,768,455 A | 9/1988 | Maxson et al. | 144/264 |
| 4,831,324 A | 5/1989 | Asakura et al. | 324/57 R |
| 4,839,644 A | 6/1989 | Safinya et al. | 340/854 |
| 4,861,074 A | 9/1989 | Eastlund et al. | 285/53 |
| 4,874,925 A | 10/1989 | Dickenson | 249/301 |
| 4,970,467 A | 11/1990 | Burnett | 324/637 |
| 4,992,001 A | 2/1991 | Harrison | 405/166 |
| 4,996,879 A | 3/1991 | Kruka et al. | 73/592 |
| 5,072,622 A | 12/1991 | Roach et al. | 73/40.5 R |
| 5,172,730 A | 12/1992 | Driver | 138/104 |
| 5,189,374 A | 2/1993 | Burnett | 324/534 |
| 5,270,661 A | 12/1993 | Burnett | 324/527 |
| 5,289,561 A | 2/1994 | Filho | 392/478 |
| 5,421,675 A | 6/1995 | Brown et al. | 405/170 |
| 5,464,307 A | 11/1995 | Wilkins | 405/166 |
| 5,490,562 A | 2/1996 | Arnold | 166/267 |
| 5,605,798 A | 2/1997 | Koster | 435/6 |
| 5,801,953 A | 9/1998 | Thoma et al. | 364/487 |
| 5,836,719 A | 11/1998 | Martin et al. | 405/166 |
| 5,905,194 A | 5/1999 | Strong | 73/40.5 |
| 6,000,438 A | 12/1999 | Ohrn | 138/149 |
| 6,049,657 A | 4/2000 | Sumner | 392/469 |
| 6,058,979 A | 5/2000 | Watkins | 138/149 |
| 6,114,857 A | 9/2000 | Kohl | 324/534 |
| 6,142,707 A | 11/2000 | Bass et al. | 405/158 |
| 6,171,025 B1 * | 1/2001 | Langner | 73/40.5 |
| 6,179,523 B1 | 1/2001 | Langner et al. | 405/169 |
| 6,264,401 B1 * | 7/2001 | Langner | 405/169 |
| 6,278,095 B1 | 8/2001 | Bass et al. | 219/629 |
| 6,278,096 B1 * | 8/2001 | Bass | 219/629 |
| 6,292,627 B1 | 9/2001 | Gilchrist, Jr. et al. | 392/311 |
| 6,305,429 B1 | 10/2001 | Welch et al. | 138/149 |
| 6,315,497 B1 | 11/2001 | Wittman et al. | 405/158 |
| 6,364,401 B1 | 4/2002 | Kim | 296/194 |
| 6,371,693 B1 | 4/2002 | Kopp et al. | 405/158 |
| 6,382,259 B1 | 5/2002 | Codling | 138/149 |
| 6,509,557 B1 | 1/2003 | Bass | 219/772 |
| 2003/0015436 A1 | 1/2003 | Bass et al. | 205/740 |
| 2003/0015519 A1 | 1/2003 | Stone, Jr. | 219/494 |
| 2003/0016028 A1 | 1/2003 | Bass | 324/642 |
| 2003/0017007 A1 | 1/2003 | Bass et al. | 405/154.1 |
| 2003/0020499 A1 | 1/2003 | Bass | 324/721 |

OTHER PUBLICATIONS

"Monolithic Pipeline Electrical Isolation Joints," Hydro-Tech Systems, Inc., Engineered Pipeline Products, advertisement, Nov. 1996, 6 pp.

"New Double Pipe Insulated System (DPIS) Designed by Snamprogetti", Snamprogetti Offshore Division, Viale de Gasperi 16, San Donato Milanese, Milan, Italy, advertisement, 6 pp. no date.

"Skin Effect Pipe Heating Systems," Thermo Systems Technology, Inc. (TST), Four Commerce Park Square, 23200 Chagrin Boulevard, Suite 600, Beachwood, Ohio 44122, Copyright 1991, advertisement, 4 pp.

Stop Paraffin Build–up and Realize Your Well's Full Potential...Plug in Paratrol. International, Inc. (PTI), 15423 Vantage Parkway East, Houston, Texas 77032, advertisement, Copyright 1989, 6 pp.

"Tubing Casing Wireless Telemetry (Tucas System), "Schlumberger web page (1993/Jun. 1996), 16 pp.

A. Anselmi et al., "TTDPIS: A New Underwater Technology in the Field of Traced Insulated Pipelines," 1994 OMAE, vol. 5, Pipeline Technology, ASME, 1994, pp. 69–76.

Anonymous, Insulated Pipe –Precision Engineering, Jun. 2000, The Bayou Bulletin, Issue #8 from www.bayoupip-.com/4News/Newslwtter0 8–4.thm, 2 pages.

Anonymous, "Insulated Technique to see first use in North Sea Development", May 17, 1993, Oil and Gas Journal vol. 91, Issue 20, p. 61.

B. J. Eastlund et al., "New System Stops Paraffin Buildup,", Petroleum Engineer, Jan. 1989, 3 pp.

Brochure –Combi Pipe –the end of clogged pipelines, Alcatel Contracting Norway and Aker Engineering, 7 pp. 1991.

Brochure –World Wide Experience List –Compressed Gas Insulated Transmission Bus System Type CGIT, ABB Power T & D Company Inc., 30 Oak Street, Westborough, MA 01581, USA, 6 pp. 1996.

C. G. Langer, "Engineering Report—1979 Construction of the Cognac 12–inch Pipeline From Mississipppi Canyon Block 194 to Southwest Pass East Bay Central Facilities, Offshore Louisiana,"ES No. 74–82, Job No. 560513, Shell Oil Company, Pipeline Construction Department, * 6 pp.

Compressed Gas Insulation Transmission Bus Ducts, ABB Power T&D Company, CGIT/PB Division, Westborough, MA, US 22 pages. No Date.

DeLuca, "Field of Dreams", Apr. 1, 2001, Offshore Engineering, form www.online.com/news/features/oe/2001 0401.Fields 0.520.asp, 9 pages.

F. Aarseth and E. Bentsen, "Heating of Pipelines, and Power Supply to Subsea Electrical Equipment," Aker Engineering a.s. A. Bjømstad and B. Knutsen, Alcatel Contracting Norway a.s., DOT 1995, 23 pp.

F. R. Newbold and T. K. Perkins, "Wellbore Transmission of Electrical Power,", The Journal of Canadian Petroleum Technology, Jul.–Sep. 1978, Montreal, pp. 3–52.

F. G. Bosch, K. J. Schmitt, and B. J. Eastlund, "Evaluation of Downhole Electric Impedance Heating systems for Paraffin Control," Paper No. PCIC–90–34 presented at Industry Applications Society 37th Annual Petroleum and Chemical Industry Conference, Houston, Texas, Sep. 10–12, pp. 223–227. No. Date.

Fred S. Epstein and Gary L. White, "Understanding Impedance Heating, "Chemical Engineering, May 1996, pp. 112–118.

Gaylord, N.G., Gaylord Associates, Newark, New Jersey, "Polymers –Part I. Polyalklene Oxides and Other Polyethers"Interscience Publishers: New York–London–Syndey, pp. 9–80.

"General Product Specification—Pipeline Insulating Joint," HydroTech Systems, Engineered Pipeline Products, advertisement, pp. Oct. 13, 1994.

H. Collins and M.A.R. Lyle, Progress Reported in Design of Reelable Insulated Subsea Flow Lines, Oil and Gas Journal, Sep. 24, 1990, pp. 102–106.

K. H. Akfhampour, "A Novel Approach to Solving Downhole Fluid Flow Problems by Use of an Electric Heating System", Paper No. PCIC–85–35, 12 pp.

Krevelen, D. W., Univ. of Technology. Delft. The Netherlands, "Properties of Polymers", 3.sup.rd Edition (Revised), Elsevier; Amsterdam–Oxford–New York–Tokyo, 1990; pp. 641–653.

M. I. Mollison, "Foam Insulation Gets First Reeled Installation off Australia," Oil and Gas Journal, May 18, 1992, pp. 80–82.

Monobloc Insulating Joints Type "IK".

N. B. Carson, "A New Method for Heat Tracing Long Pipelines," ASME, 74–Pet–35, paper presented at the Petroleum Mechanical Engineering Conference, Dallas, Texas, Sep. 15–18, 1974, pp. 2–4.

Protest Document, Dec. 8, 1987 letter of Andrew W. Marr, Jr. to the Assistant Commissioner of Patents requesting issuance of U.S. Patent 4,716,960 available in the file history as of Jan. 5, 1988.

R. Wash, "Electromagnetic Energy Helps Recovery," Gulf Coast Oil World,, Jun. 1986, pp. 18–19.

"Taking Induction Heating Underwater, "Process Heating, Jul./Aug. 1995, 1p.

The Electrothermic Co. (TEC), 4916 Bear Lane, P.O. Box 4227, Corpus Christi, TX 78408 advertisement/sales brochure, 4 pp.

Anecdote –"Thermo Systems Under River Crossings" discussed in Supplemental Information Disclosure Statement filed on Jun. 22, 2000 for US Patent Application SN 08/921,737, filed Aug. 27, 1997, entitled, "Method for Maintaining Well Fluids Within a Shut–In Subsea Pipeline.".

Anecdote –"Fuel Oil Between Buildings"discussed i n Supplemental Information Disclosure Statement filed on Jun. 22, 2000 for US Patent Application SN 08/921,737, filed Aug. 27, 1997, entitled, "Method for Maintaining Well Fluids Within a Shut–In Subsea Pipeine.".

Anecdote –"Asphalt Transfer Liner from Tank Cars et al." discussed in Supplemental Information Disclosure Statement filed on Jun. 22, 2000 for US Patent Application SN 08/921,737, filed Aug. 27, 1997, entitled, "Method for Maintaining Well Fluids Within a Shut–In Subsea Pipeline.".

Production Technologies Company Invention Discosure of R. M. Bass dated Jul. 24, 1986, "Disclosure for Controlled Paraffin Deposition in Subsea Pipeines" as discussed in Supplemental Information Disclosure Statement filed on Jun. 22, 2000 for US Patent Application S/N No. 08/921, 737, filed Aug. 27, 1997, entitled "Method for Maintinaing Well Fluids Within a Shut–In Subsea Pipeline.".

Purported Invention Disclosure of Production Technologies Company, L.L.C. (PTC) by Bernard J Eastlund and John Haeber, dated Apr. 28, 1995. Apparatus for Introducing Electric Current into and Offshore Pipeline. 4pp as discussed in Supplemental Information Disclosure Statement filed on Jun. 22, 2000 for US Patent Application S/N No. 08/921, 737, filed Aug. 27, 1997, entitled "Method for Maintaining Well Fluids Within a Shut–In Subsea Pipeline.".

* cited by examiner

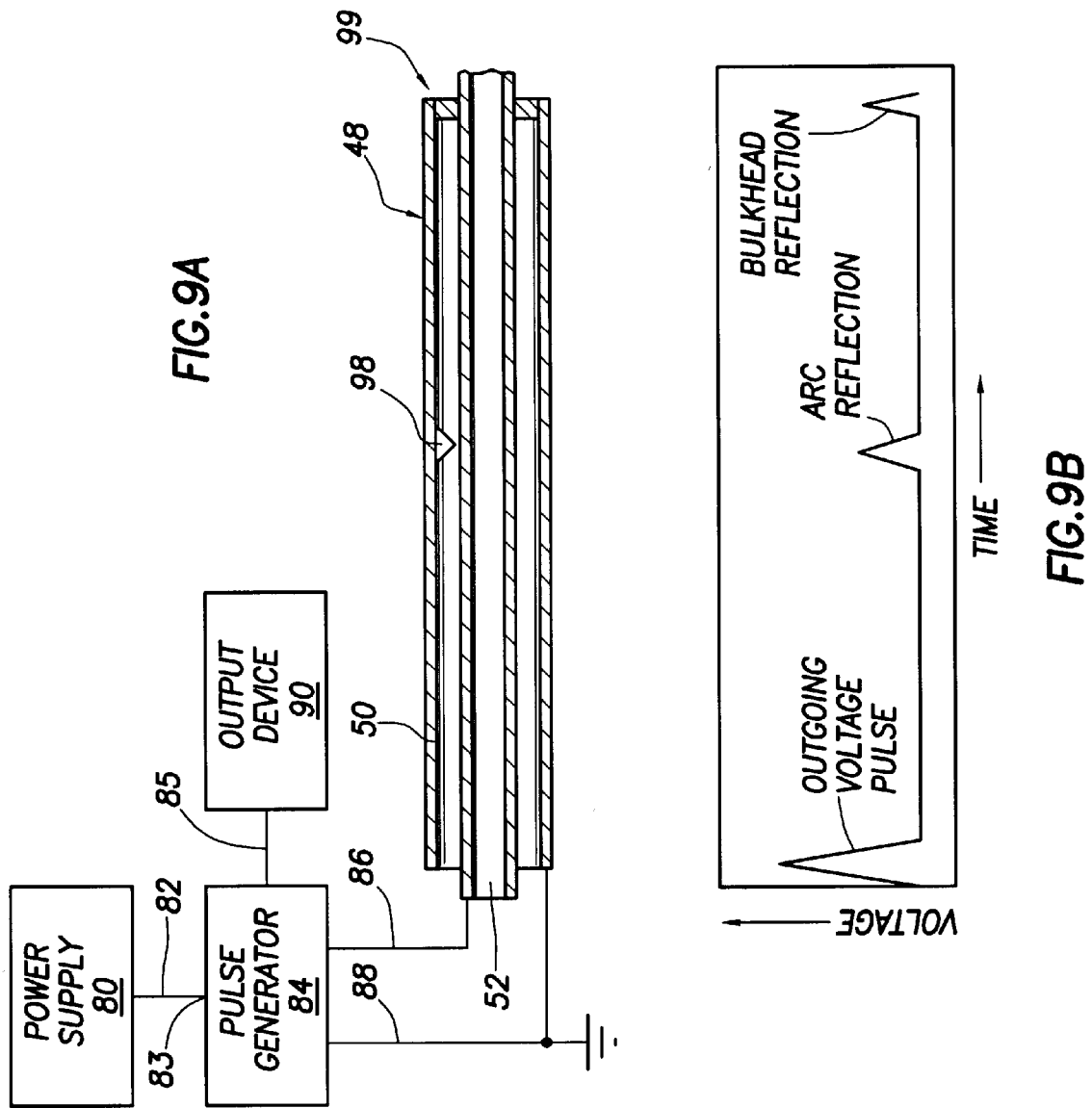

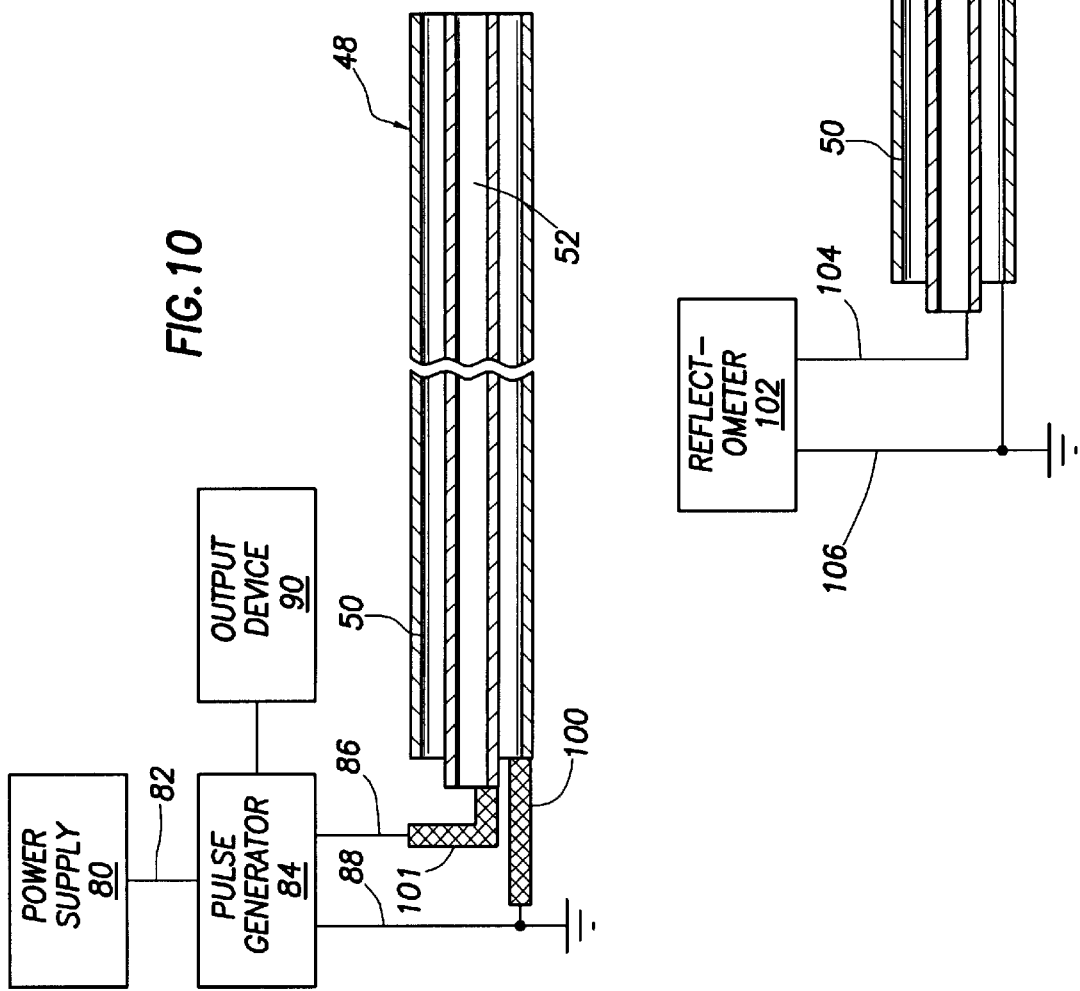

APPARATUS AND METHOD FOR ELECTRICAL TESTING OF ELECTRICALLY HEATED PIPE-IN-PIPE PIPELINE

BACKGROUND OF THE INVENTION

1. Field of the Invention

The present invention relates to electrical testing of electrically heated subsea pipelines. More particularly the invention relates to electrical testing pipelines with a pipe-inside-pipe configuration.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography require excessive time and may create operational problems and be costly in terms of lost production.

The problem of lower temperatures in subsea pipelines has been addressed by a variety of heating methods, including electrical heating. Heating by a variety of electrical methods is well known in the industry. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999). One electrical heating method is the pipe-in-pipe method. In one configuration of this method, a pipe-in-pipe subsea pipeline is provided by which a flow line for transporting well fluids is the inner pipe and it is surrounded concentrically by and electrically insulated from an electrically conductive outer pipe until the two pipes are electrically connected at the distal end of a heated segment. Voltage is applied between the inner and outer pipes at the opposite end and electrical current flows along the exterior surface of the inner pipe and along the interior surface of the outer pipe. This pipe-in-pipe method of heating is disclosed, for example, in U.S. Pat. No. 6,142,707, which is commonly assigned and incorporated by reference herein. Apparatus that can be used in the annulus is disclosed, for example, in a U.S. patent application entitled "Annulus for Electrically Heated Pipe-in-Pipe Subsea Pipeline," filed concurrently herewith and incorporated by reference herein. Various embodiments of pipe-in-pipe subsea pipelines having an electrically insulating coating over the inner pipe in first selected segments of the annulus, an electrically insulating layer ring surrounding the inner pipe in second selected segments of the annulus, and a thermally insulating layer ring surrounding the inner pipe in third selected segments of the annulus are disclosed. The inner and outer pipes are shorted together at a distal end by a welded bulkhead. The electrical power is supplied through an electrical isolating joint at the power input end of a segment of line to be heated. Alternating current, normally at about 60 Hz, is used. The voltage across the annulus is highest at the isolating joint and falls linearly to zero at the bulkhead. The current is essentially constant along the entire length of the pipe segment that is heated. Two key electrical effects, the skin effect and the proximity effect, confine the current flow largely to the annulus surfaces. Consequently, most of the current is effectively isolated from the produced fluids and the seawater around the pipeline.

As post-installation repair of the pipe-in-pipe subsea pipeline may be difficult or impractical due to the general inaccessibility of the system's location on the seabed, it is desirable to determine the electrical integrity and/or operability of the pipe-in-pipe subsea pipeline during the construction or installation phases of the pipe-in-pipe subsea pipeline. Faults or weak spots may indicate low breakdown voltage. Thus, it is further desirable to detect the electrical integrity of the pipe-in-pipe subsea pipeline before operation to determine any faults or weak spots that have occurred during construction, installation, or commissioning phases or may occur during operation phases of the pipe-in-pipe subsea pipeline. It would also be advantageous to perform quality assurance tests to detect any variations in the electrical integrity of the pipe-in-pipe subsea pipeline during construction, installation, commissioning, or operation phases. Moreover, it would be advantageous to determine the approximate location of an electrical defect or fault along the length of a pipe-in-pipe pipeline segment or along the length a pipe-in-pipe subsea pipeline.

SUMMARY OF THE INVENTION

Towards providing these and other goals, the present invention is directed to a method and apparatus for testing a pipe-in-pipe pipeline before, during, and after subsea electrical heating operation. The present invention is generally directed to a method and an apparatus for electrically testing a pipe-in-pipe pipeline during the construction, installation, commissioning, operation, or dismantling phases of an electrically heated pipe-in-pipe subsea pipeline.

One embodiment of the present invention is directed to a high voltage qualification test of the electrical integrity of a pipe-in-pipe pipeline. The method and apparatus disclosed herein for high voltage qualification testing of the electrical integrity of a pipe-in-pipe pipeline involve a power supply electrically connected to the inner pipe of a pipe-in-pipe pipeline, a return lead electrically connecting the outer pipe to the power supply, applying a voltage from the power supply to the pipe-in-pipe pipeline and measuring the resulting current across the pipe-in-pipe pipeline.

Another embodiment of the present invention is directed to a method and an apparatus for performing a voltage pulse test of the electrical integrity of a pipe-in-pipe pipeline. The method and apparatus disclosed herein for voltage pulse testing of the electrical integrity of a pipe-in-pipe pipeline involve a power supply electrically connected to a voltage pulse generator, the voltage pulse generator electrically connected to the inner pipe of a pipe-in-pipe pipeline, and an output device electrically connected to the voltage pulse generator, wherein the output device indicates the voltage pulse. For a low voltage pulse test, the voltage pulse generator provides a voltage pulse output of less than about 400 volts. For a high voltage pulse test, the voltage pulse generator provides a voltage pulse output of greater than about 400 volts.

Yet another embodiment of the present invention is directed to a method and an apparatus for performing a low voltage pulse test of the electrical integrity of a pipe-in-pipe pipeline, comprising a time domain reflectometer electrically connected to the inner pipe of a pipe-in-pipe pipeline and a voltage pulse of less than about 100 volts applied to the pipe-in-pipe pipeline.

DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 9A is a diagram of another configuration of the present invention directed to voltage pulse testing a pipe-in-pipe pipeline.

FIG. 9B is a graph of voltage versus time depicting indicators of reflections of voltage pulses during voltage pulse test of a pipe-in-pipe pipeline.

FIG. 10 is a diagram of another configuration of the present invention directed to voltage pulse testing a pipe-in-pipe pipeline, FIG. 11 is a diagram of another configuration of the present invention directed to low voltage pulse testing a pipe-in-pipe pipeline.

DETAILED DESCRIPTION

U.S. Pat. No. 6,142,707 and patent applications filed concurrently herewith and titled "Annulus for Electrically Heated Pipe-in-Pipe Subsea Pipeline," (Ser. No. 09/910, 696); "Method of Installation of Electrically Heated Pipe-in-Pipe Subsea Pipeline," (Ser. No. 09/910,678); and "Corrosion Protection of Electrically Heated Pipe-in-Pipe Subsea Pipeline," (Ser. No. 09/910,489), all commonly owned, are incorporated herein by reference.

Figure 1:
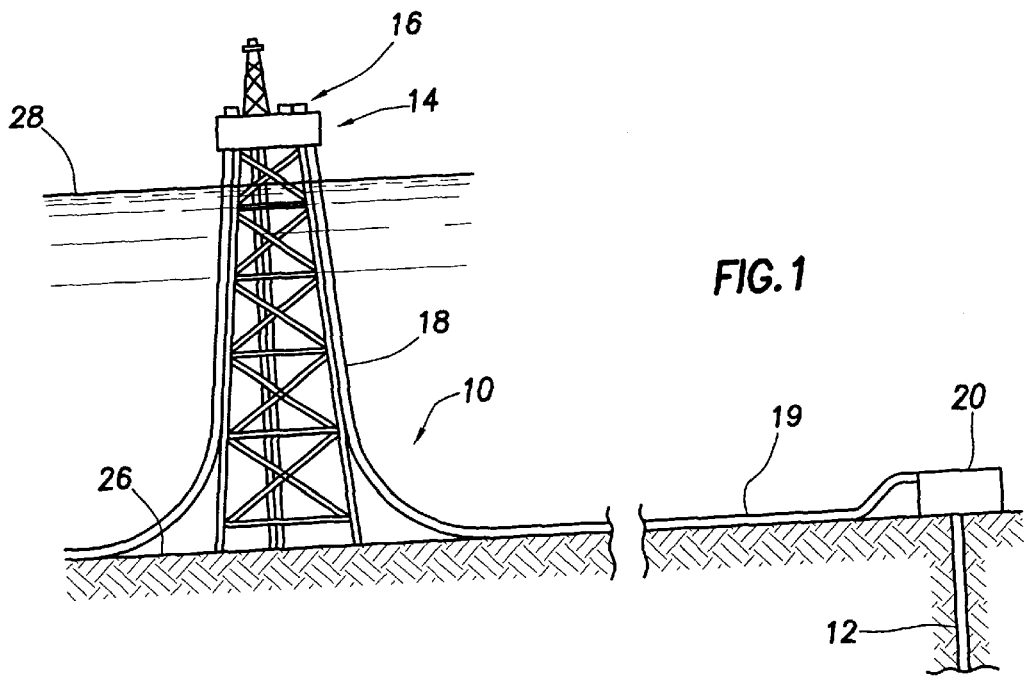
FIG. 1 is a view of a platform and a satellite subsea well connected by subsea pipeline.

FIG. 1 illustrates the environment of the present invention. Here remote satellite well 12 is connected to platform 14 with subsea pipe-in-pipe pipeline 10. Subsea pipeline 10 may consist of seafloor section 19 and riser section 18. Surface facilities 16 on platform 14 include an electrical power supply. Seafloor section 19 may be up to 20 or more miles long. Pipe-in-pipe flowline 10 may be composed of 40-ft joints of pipe welded together. It is common to form individual 160 ft segments of pipe, called quads (four joints), which are then welded together as they are placed subsea to form pipe-in-pipe flowline 10. Seafloor section 19, which may be a half-mile or more below surface 28 of the ocean, terminates at sled 20.

Figure 2:
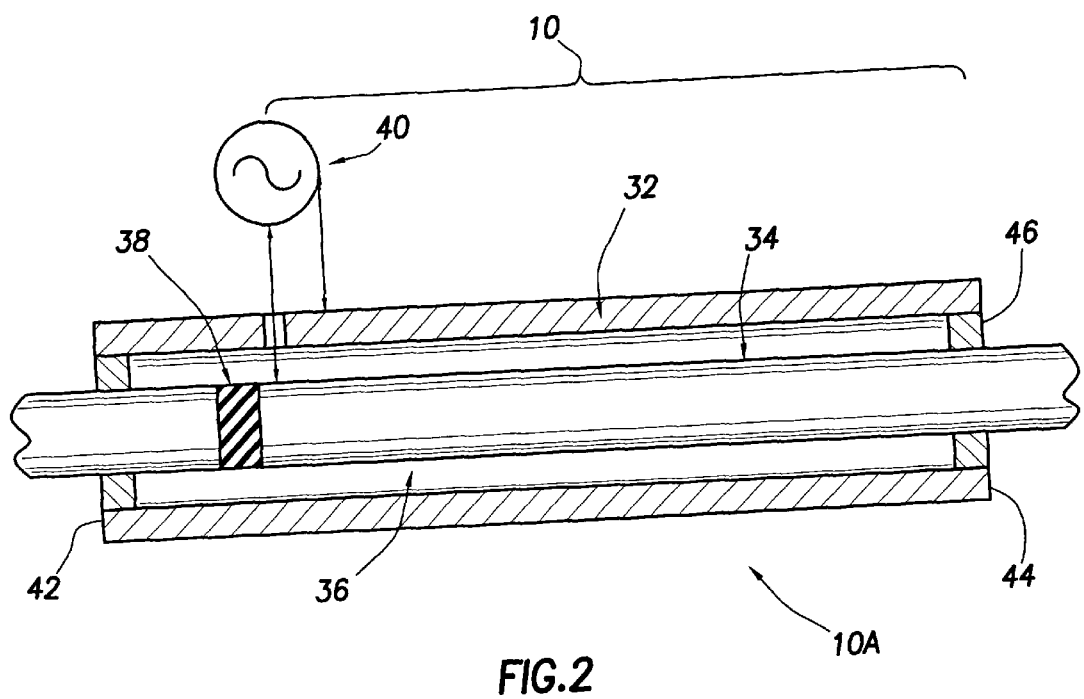
FIG. 2 is a cross sectional sketch of a pipe-in-pipe configuration for direct heating of a pipeline.

FIG. 2 illustrates one embodiment of an electrically heated pipe-in-pipe pipeline. In the embodiment shown in FIG. 2, pipeline 10 includes electrically conductive outer pipe 32 and electrically conductive product flowline or inner pipe 34 arranged concentrically. Annulus 36 is defined between inner pipe 34 and outer pipe 32. Insulating joint 38, which is normally in proximity to platform 14, structurally joins and electrically insulates inner pipe 34 from outer pipe 32. Electrical power supply 40 is connected across inner pipe 34 and outer pipe 32. Thus pipe-in-pipe flowline 10 serves as a power transmission line, with the circuit completed by an electrical pathway connecting inner pipe 34 and outer pipe 32 at a second end 44 of the pipeline, which is normally in proximity to sled 20. By transmitting power, the entire heated segment of pipeline 10 serves as an electrical heater. The connection for joining the inner and outer pipes is provided by electrically conductive bulkhead 46. In another embodiment, insulating joint 38 is placed between two bulkheads and electrical power is input at an intermediate point, which may be near the midpoint of pipeline 10, with electrical pathways completing the circuit on both ends of pipeline 10.

Figure 3:
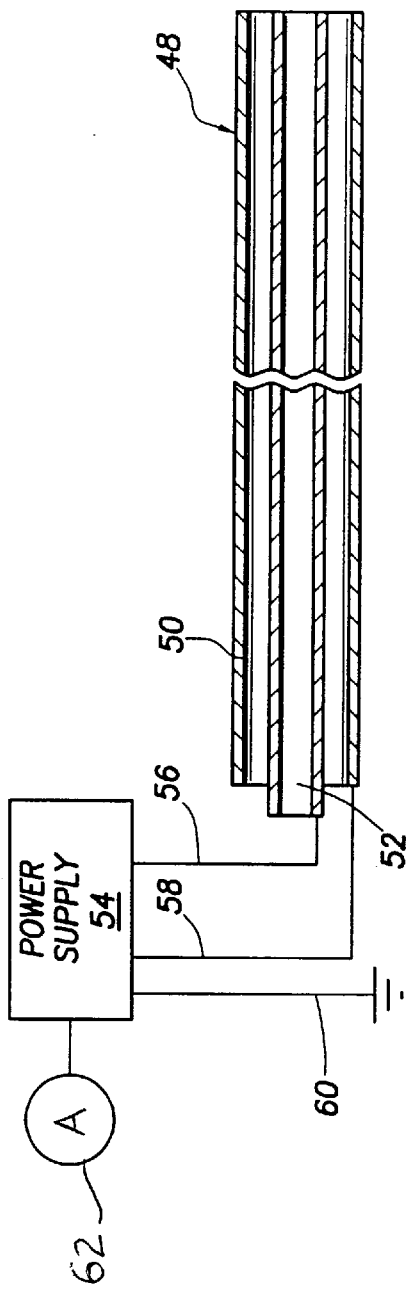
FIG. 3 is a diagram of a configuration of the present invention directed to high voltage qualification testing a pipe-in-pipe pipeline.

FIG. 3 illustrates an embodiment of the present invention directed to high voltage qualification testing a quad or other segment 48 of a pipe-in-pipe pipeline. The high voltage qualification test may be applied to segment 48 during construction and installation phases of electrically heated pipe-in-pipe pipeline 10. For instance, a high voltage qualification test may be performed on a quad (which are 160 foot segments) on the ready rack, after the quad has been assembled and loaded upon the ready rack for transport to a lay barge. Alternatively, a high voltage qualification test may be performed on the lay barge after fabrication and before installation. Preferably, the high voltage qualification test is performed while segment 48 is an open electrical circuit. Segment 48 has an outer pipe 50 and an inner pipe 52. Power supply 54 may be connected to inner pipe 52 via voltage lead 56. Return lead 58 connects outer pipe 50 to power supply 54. Power supply 54 may be grounded by ground lead 60. A suitable embodiment of power supply 54 may be AC/DC Hipot/Megohmmeter Model PAD 10-25 manufactured by PHENIX Technologies. Equivalents to such device are readily available and within the knowledge of one of skill in the art.

The voltage output from power supply 54 may be either direct current (DC) or alternating current (AC). The voltage output from power supply 54 is preferably direct current and may be greater than about 400 volts. If the voltage output is alternating current, a power supply with greater current capacity than a direct current power supply may be desirable. Preferably, the voltage output from power supply 54 equals or exceeds the operating voltage of segment 48 during subsea electrical heating operation. The operating voltage of segment 48 during subsea electrical heating operation may range up to about 15,000 volts. In another embodiment, the voltage output from the power supply is greater than about 3,000 volts DC. In yet another embodiment, voltage output from power supply 54 is greater than about 10,000 volts DC, and preferably, about 15,000 volts DC. The voltage output may be applied to segment 48 for any duration of time. In one embodiment, the voltage output exceeds about 1 second. In yet another embodiment, the voltage output is applied to segment 48 for a sustained duration of time, which may range from about 1 minute to about 10 minutes, preferably about 5 minutes. The current output of power supply 54 may determine the length of segment 48 that may be high voltage qualification tested.

Figure 4:
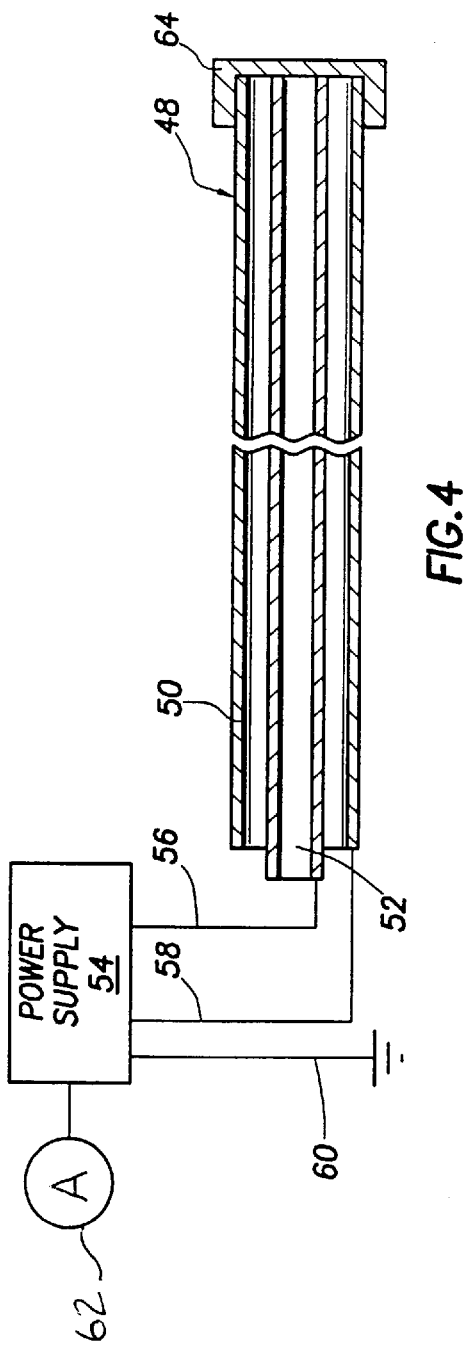
FIG. 4 is a diagram of another configuration of the present invention directed to high voltage qualification testing a pipe-in-pipe pipeline.

The current leakage across the length of segment 48 may be measured to determine the electrical integrity of the segment. In one embodiment, the current leakage across segment 48 may be measured using ammeter 62. Ammeter 62 may be integral to the device providing power supply 54, as shown in FIG. 3, or may be separately placed in voltage lead 56 or return lead 58. An alarm may be connected to ammeter 62 and may be set to an audible alarm in the event of a specified level of current leakage. In one embodiment, current leakage exceeding about 5 milliamps may indicate failure of the electrical integrity of segment 48. If the output voltage applied to segment 48 is not sustained with low current flow for the duration of the test, such leakage of current indicates low resistance of components within the annulus between outer pipe 50 and inner pipe 52, low resistance paths between outer pipe 50 and inner pipe 52, electric arcing, or other failure of the electric integrity of segment 48. In yet another embodiment, the distal end of segment 48 (opposing power supply 54) may be capped with protective end cap 64, as illustrated in FIG. 4, to prevent electrical contact across the annulus. Additionally, before disconnecting or connecting voltage lead 56 and return lead 58, segment 48 may be grounded.

Figure 5:
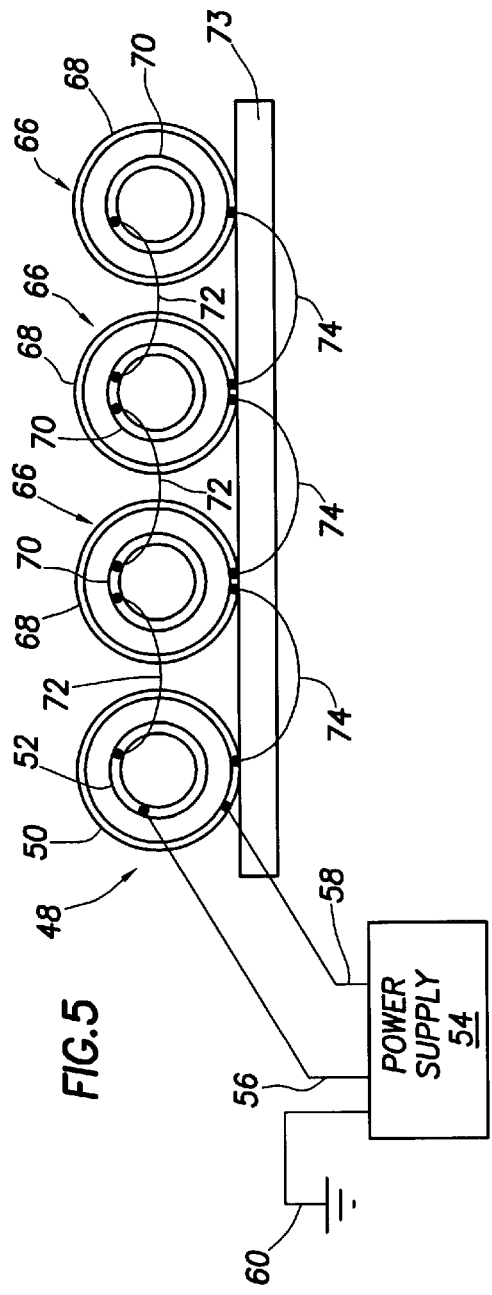
FIG. 5 is a diagram of a configuration of the present invention directed to high voltage qualification testing more than one pipe-in-pipe pipeline.

FIG. 5 illustrates another embodiment of the present invention directed to high voltage qualification testing of two or more segments 48. To expedite the measurement process, more than one segment 48 may be connected as shown in FIG. 5. Although FIG. 5 illustrates this embodiment on rack 73, the test is not limited to being performed on rack 73. Power supply 54 may be connected to inner pipe 52 of first segment 48 via voltage lead 56. Return lead 58 may connect outer pipe 50 of first segment 48 to power supply 54. Power supply 54 may be grounded by ground lead 60. Outer pipe 50 of first segment 48 on rack 73 may be connected to outer pipe 68 of second segment 66 via interconnecting line 74. Inner pipe 52 of first segment 48 may be connected to inner pipe 70 of second segment 66 via interconnecting line 72. The same connections may be made between second segment 66 and third segment 66 and so on for additional segments.

Figure 6:
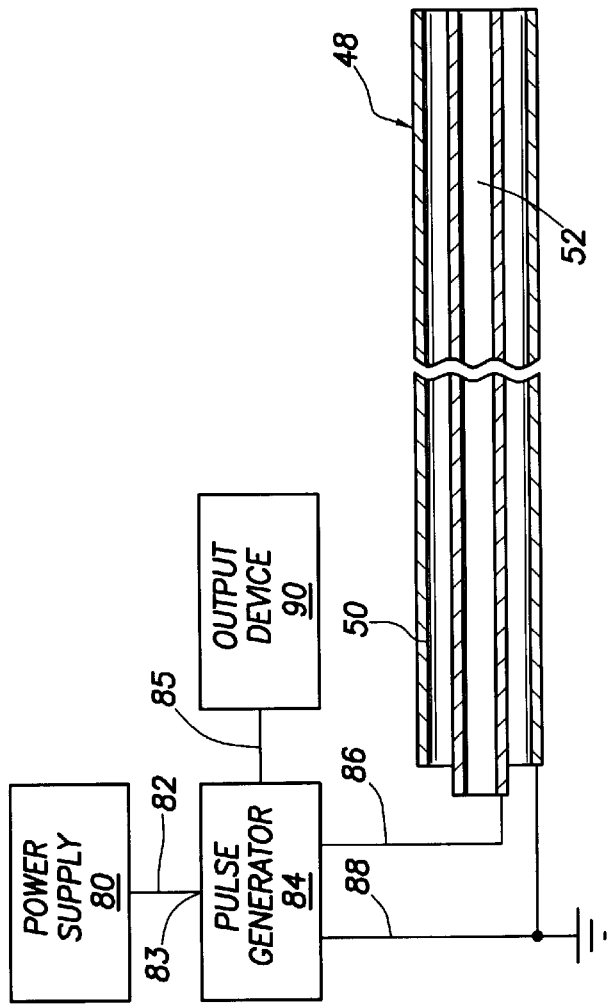
FIG. 6 is a diagram of a configuration of the present invention directed to voltage pulse testing a pipe-in-pipe pipeline.

FIG. 6 illustrates an embodiment of the present invention directed to voltage pulse testing segment 48, which includes both high voltage pulse testing segment 48 and low voltage pulse testing segment 48. A voltage pulse test may be used to determine the electrical integrity of installed pipe-in-pipe subsea pipeline 10 (FIG. 1), which is made up of a required number of segments such as segment 48. Moreover, a voltage pulse test may be used to approximate the location of an electrical fault, weak spot or defect along the length of pipeline 10 after installation. Among other advantages offered, a high voltage pulse test may be used to test the electrical integrity of segment 48 after it has been welded onto pipe-in-pipe subsea pipeline 10.

The distance range of a voltage pulse test may depend upon the attenuation of the voltage pulse along the length of pipeline 10, and the distance range of a voltage pulse test may be increased by increasing the pulse width. Surprisingly, a high-voltage pulse having a pulse width of 1000 nanoseconds was detected after reflection from a bulkhead about 7 miles away. However, the amplitude of the pulse decreases rapidly with distance, so that the high voltage pulse test is most effective near the point of application of the voltage pulse. The high voltage pulse test may detect a dead short at any point along the length of a pipeline. Failures that may be detectable include defects in welding or waterstop measures during the construction of a pipeline, short circuits caused by ingress of water into the annulus, insulation defects in the annulus, or dented inner or outer pipe. These situations, among others, may create electrical breakdown in a segment under high voltage. The high voltage pulse test may be applied during construction, installation, commissioning and operation phases of pipe-in-pipe subsea pipeline. Preferably it is applied after each segment such as segment 48 is added to a pipeline, and it will be a more severe test of the last segment added.

Referring to FIG. 6, power supply 80 may be connected to voltage pulse generator 84 via voltage interconnect 82, which feeds the voltage output from power supply 80 to input 83 of voltage pulse generator 84. Conductor 86 conducts voltage pulse output from voltage pulse generator 84 to inner pipe 52 of segment 48. Optionally, shield 88 connects outer pipe 50 to voltage pulse generator 84. In one embodiment, conductor 86 and shield 88 may be integral to a single coax cable. In yet another embodiment, shield 88 and conductor 86 may be separately embodied. Alternatively, voltage pulse generator 84 may be grounded to a ground other than outer pipe 50.

Output device 90 receives a voltage signal from voltage pulse generator 84 via voltage signal feed 85. Output device 90 may additionally indicate voltage pulse output from voltage pulse generator 84 to segment 48 (which has become a part of pipeline 10) by indicating and optionally recording, storing, or displaying voltage pulse output. Output device 90 may additionally indicate reflections of any substantial change in characteristic impedance received from segment 48 or other segments in pipeline 10. Output device 90 may be a measuring device. Alternatively or additionally to being a measuring device, output device 90 may be a display device, such as a digital or analog display screen, digital or analog oscilloscope, or any other equivalent display device, which may be able to display the voltage pulse output and a reflection of any substantial change in characteristic impedance received from segment 48 or pipeline 10. Optionally, output device 90 may be a recordable device such as a device able to record an indicator of the voltage pulse output and a reflection of any substantial change in characteristic impedance received from segment 48 or pipeline 10, in machine readable format or other equivalent format, onto hard disk, CD ROM, or other recordable media. Alternatively, output device 90 may be a storage device, able to store an indicator of the voltage pulse output and a reflection of any substantial change in characteristic impedance received from segment 48, such as a storage oscilloscope, an electromagnetic device or other equivalent storage devices. Optionally output device 90 may integrate recording, storage, and display capabilities in one or more output devices. In one embodiment output device 90 may be interconnected to voltage pulse generator 84 via a voltage divider, not illustrated in the figures, which may reduce the voltage to a level acceptable to output device 90. In another embodiment, such a voltage probe, also not illustrated, may allow output device 90 to measure, display, store or record voltage pulses applied to segment 48. Such voltage probe or voltage divider may be separate from output device 90 or may be integral to output device 90. Alternatively, such voltage probe or voltage divider may be separate from voltage pulse generator 84 or may be integral to voltage pulse generator 84.

Figure 7:
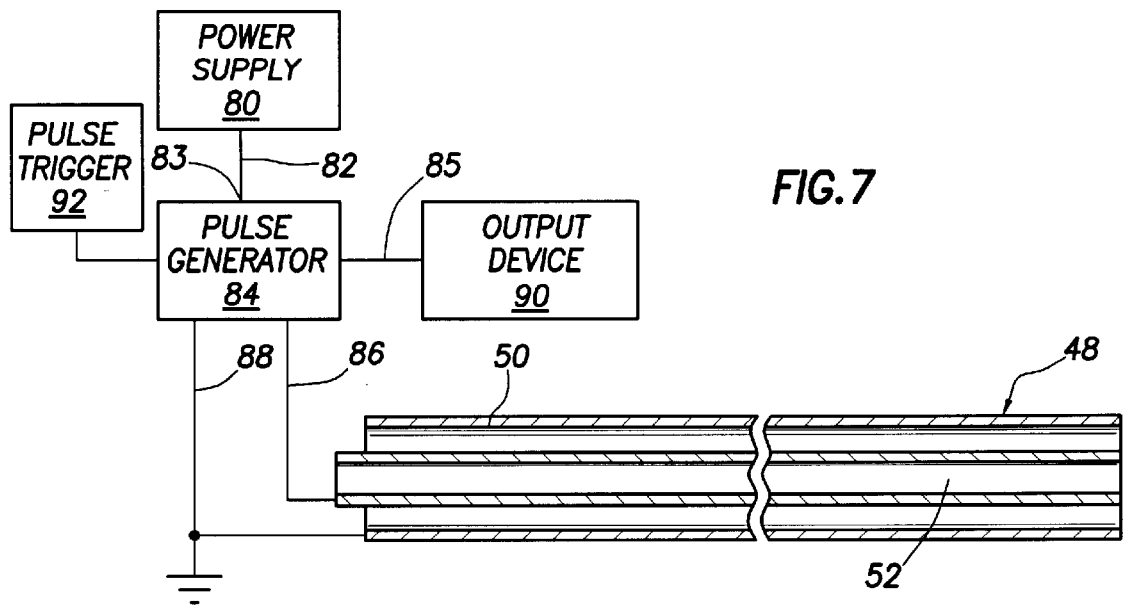
FIG. 7 is a diagram of another configuration of the present invention directed to voltage pulse testing a pipe-in-pipe pipeline.

FIG. 7 illustrates another embodiment of this invention directed to high voltage pulse testing segment 48 or pipeline 10, wherein pulse trigger 92 may be connected to pulse generator 84 to enable a voltage pulse output. An example of pulse trigger 92 may be a TTL (Transistor Transistor Logic) mode pulse generator, such as Model PDG-2510 manufactured by Directed Energy, Inc. Alternatively, pulse trigger 92 may be integral to a device additionally integrating voltage pulse generator 90 and optionally power supply 80. The scope of the present invention envisions other equivalent pulse triggers known to those of skill in the art. The scope of the present invention encompasses various embodiments of the high voltage pulse test in which power supply 80, voltage pulse generator 84, voltage interconnect 82, pulse trigger 92 and/or output device 90 may be integral to one or more devices or exist as separate devices with interim devices connected therebetween.

Figure 8:
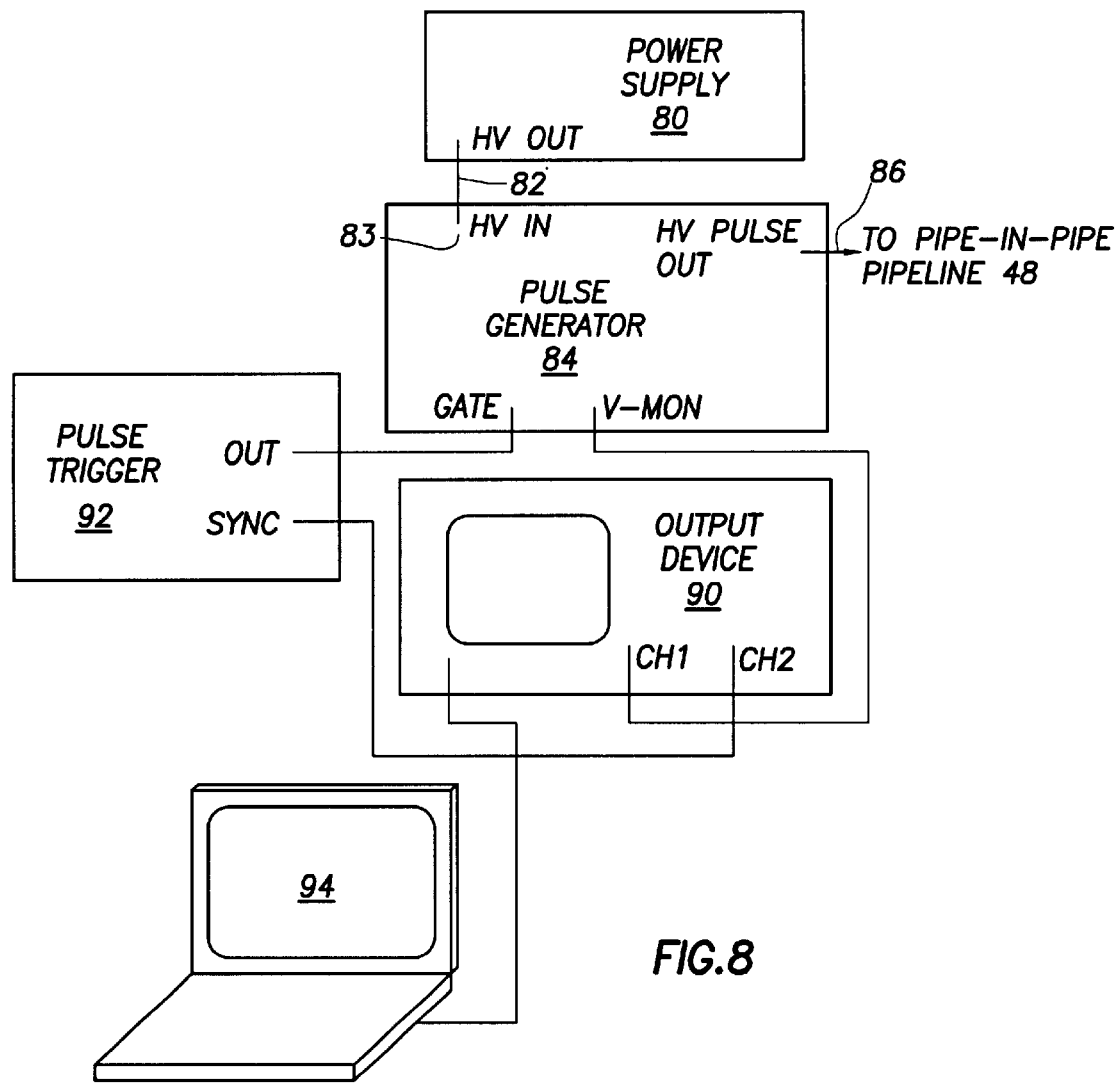
FIG. 8 is a diagram of another configuration of the present invention directed to voltage pulse testing a pipe-in-pipe pipeline.

FIG. 8 provides yet another embodiment of this invention directed to high voltage pulse testing segment 48 or pipeline 10. Power supply 80 may be PS/EL05P08.0L1J manufactured by Glassman. An exemplary voltage pulse generator 84 may be PVX-4130 manufactured by Directed Energy, Inc. An exemplary conductor 86 may be a coax cable. Optionally, a voltage junction box with alligator clips may be used to attach conductor 86 to inner pipe 52 and outer pipe 50. An exemplary pulse trigger 92 may be digital delay/pulse generator PDG-2510 manufactured by Directed Energy, Inc. An exemplary output device 90 may be a digital storage oscilloscope TDS220 manufactured by Tektronix, wherein the storage scope is fitted with a communications adapter. Alternatively, output device 90 may be connected to computer 94 to optionally display or store an indicator of the voltage pulse output or a reflection of any substantial change in characteristic impedance received from segment 48. Equivalents to devices displayed in FIGS. 6, 7, and 8 are readily available and within the knowledge of one of skill in the art. The scope of the present invention encompasses various embodiments of the high voltage pulse test in which power supply 80, voltage pulse generator 84, voltage interconnect 82, output device 90, and/or pulse trigger 92 may be integral to one or more devices or exist as separate devices with interim devices connected therebetween.

FIG. 9A illustrates one embodiment of the present invention directed to high voltage pulse testing of pipeline 10. As illustrated in FIG. 9A, exemplary arc location 98 may indicate the existence of a narrowing of the annulus between outer pipe 50 and inner pipe 52. In graphic form, indicating voltage as a function of time, FIG. 9B illustrates the reflection of voltage pulse output applied to pipeline 10, the reflection of exemplary arc location 98, and the reflection of bulkhead 99 located at the distal end of pipeline 10.

A high voltage pulse output from voltage pulse generator 84 may range from about 400 volts to about 6,000 volts. Although the scope of the present invention includes a high voltage pulse output that may exceed 3 times the operating voltage of segment 48, it may be preferable to limit the high voltage pulse output to 3 times the operating voltage of segment 48. Optionally, the high voltage pulse output may be adjusted according to at least two variables: (1) pulse width and (2) number of pulses per second. In one embodiment, the pulse width may be set in a range from about 2 nanoseconds to about 2000 nanoseconds, and the number of pulses per second may be set in a range from a single shot pulse to about 10 KHz.

A voltage pulse may travel down a 160 foot length of segment 48 within a range of about 160 nanoseconds to about 250 nanoseconds. If an electrical fault develops in that length of segment 48 as a result of the voltage pulse output applied to segment 48, a reflection from that fault may be indicated in output device 90. As the voltage pulse travels down pipeline 10 towards bulkhead 99 located at the distal end of the pipeline, the voltage pulse attenuates such that the voltage reflected in output device 90 will be less than the initial voltage pulse output from voltage pulse generator 84.

FIG. 10 illustrates yet another embodiment of the present invention directed to high voltage pulse testing segment 48 or pipeline 10. This embodiment illustrates a connection between voltage pulse generator 84 and segment 48 in the event the impedance of segment 48 is different from the impedance of power supply 80. In such circumstances, it may be desirable to detect the reflection of any substantial change in characteristic impedance that may exist in a first segment of segment 48, wherein such change may otherwise not be indicated in the absence of a difference in impedance between the impedance of segment 48 and the impedance of power supply 80. Delay line 100 and 101 may be sized in length such that they may accommodate such impedance differential so that the reflection of any substantial change in characteristic impedance received from the first segment of segment 48 is not blanked. Delay line 100 may be connected between shield 88 and outer pipe 50. Delay line 101 may be connected between conductor 86 and inner pipe 52. Inclusion of delay lines 100 and 101 in the configuration of the voltage pulse test may contribute to a reduction of the voltage pulse output received by segment 48. Therefore, it may be desirable to consider the reduction of voltage pulse due to the delay lines when selecting power supply 80. In the event the impedance of segment 48 is different from the impedance of power supply 80, the voltage pulse output received by segment 48 may be reduced due to such impedance differential.

The configurations illustrated in FIGS. 6 and 7 illustrate yet another embodiment of the present invention directed to a low-voltage pulse test of the segment 48, wherein power supply 80 provides a low voltage output to voltage pulse generator 84 via voltage interconnect 82, and conductor 86 conducts low voltage pulse output from voltage pulse generator 84 to inner pipe 52 of segment 48. Low voltage pulse output encompasses voltages of not greater than about 400 volts.

FIG. 11 illustrates yet another embodiment of the present invention directed to a low voltage pulse test of segment 48 or pipeline 10. The low voltage pulse test may be used during the installation, commissioning, operation, or dismantling phases of the pipe-in-pipe subsea pipeline. The low voltage pulse test may be used to detect a dead short in segment 48. The low voltage pulse test may also be used to detect a breach in outer pipe 50, in which event the annulus may be flooded with seawater. Thus, it may be desirable to periodically test the pipe-in-pipe subsea pipeline during operation. It may be further desirable to obtain a signature baseline of the pipe-in-pipe subsea pipeline before operation. As illustrated in FIG. 11, conductor 104 conducts voltage pulse output from time domain reflectometer 102 to inner pipe 52 of segment 48. Shield 106 connects outer pipe 50 to time domain reflectometer 102. In one embodiment, conductor 104 and shield 106 may be integral to a single coax cable, or an equivalent thereto. In another embodiment, conductor 104 and shield 106 may be separately embodied. It may be desirable to accommodate the output impedance of time domain reflectometer 102 to the impedance of conductor 104 and shield 106.

Time domain reflectometer 102 may send a low voltage pulse to segment 48 and may record the reflection of the pulse as the pulse returns. By measuring the time taken for a pulse to return to time domain reflectometer 102, time domain reflectometer 102 may be used to determine the approximate location of a discontinuity reflected by a returning pulse. Moreover, time domain reflectometer 102 may be used to detect changes in characteristic impedance within segment 48. Although one example of time domain reflectometer 102 is Model 1503B Metallic Time Domain Reflectometer manufactured by Tektronix, other equivalents are readily available and within the knowledge of one of skill in the art. Exemplary pulse widths range from about 2 to about 1000 nanoseconds, although greater pulse widths are contemplated within the scope of the present invention. The distance range of the low voltage pulse test may depend upon the attenuation of the voltage pulse along the length of pipe-in-pipe pipeline, and the distance range of this embodiment may be increased by increasing the pulse width. The voltage pulse output of time domain reflectometer 102 may be below 50 volts, preferably below 50 volts and most preferably about 10 volts.

EXAMPLE 1

Figure 12:
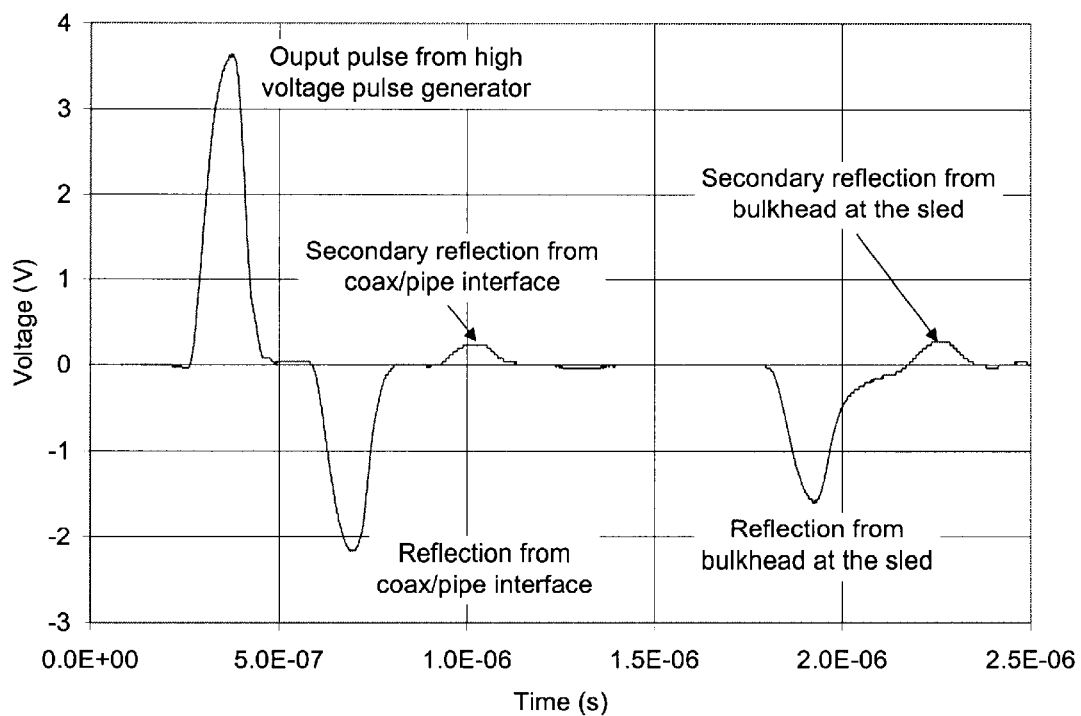
FIG. 12 is a graphical plot of voltage versus time illustrating an exemplary trace of a high voltage pulse test.
Figure 13:
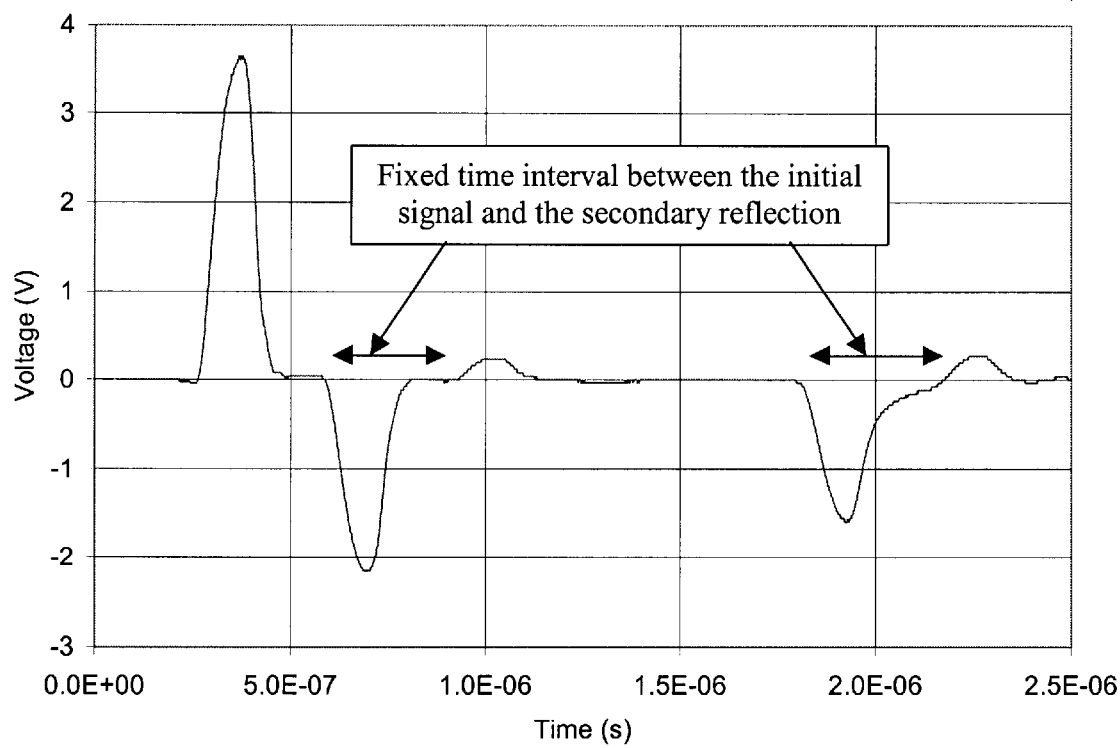
FIG. 13 is a graphical plot of voltage versus time illustrating an exemplary trace of a high voltage pulse test.

FIG. 12, an exemplary oscilloscope trace showing voltage versus time, illustrates an exemplary trace of a pipe-in-pipe pipeline without electrical problems. In this example, the bulkhead on the sled at the distal end of a pipe-in-pipe pipeline is located about 173 meters away from the other end of the pipeline. The reflection from the bulkhead sled appears as a short circuit on the oscilloscope. Secondary reflections occur due to the impedance differential between the cable and the output impedance of the high voltage pulse generator and between the cable and the pipeline. Due to the fixed length of cable between the high voltage pulse generator and the pipeline, the secondary reflection occurs at a fixed time after the initial signal. FIG. 13 shows two secondary reflections from two separate signals. The trace of FIG. 13 is similar to the trace shown in FIG. 12, but the distances between the initial signal and its secondary reflection have been highlighted.

The nature of the impedance differential between the high voltage pulse generator and the pipeline result in the sign of the reflected pulses alternating for each successive reflection. Thus, if the initial pulse is negative, the secondary pulse may be positive, the next may be negative and so on.

EXAMPLE 2

Figure 14:
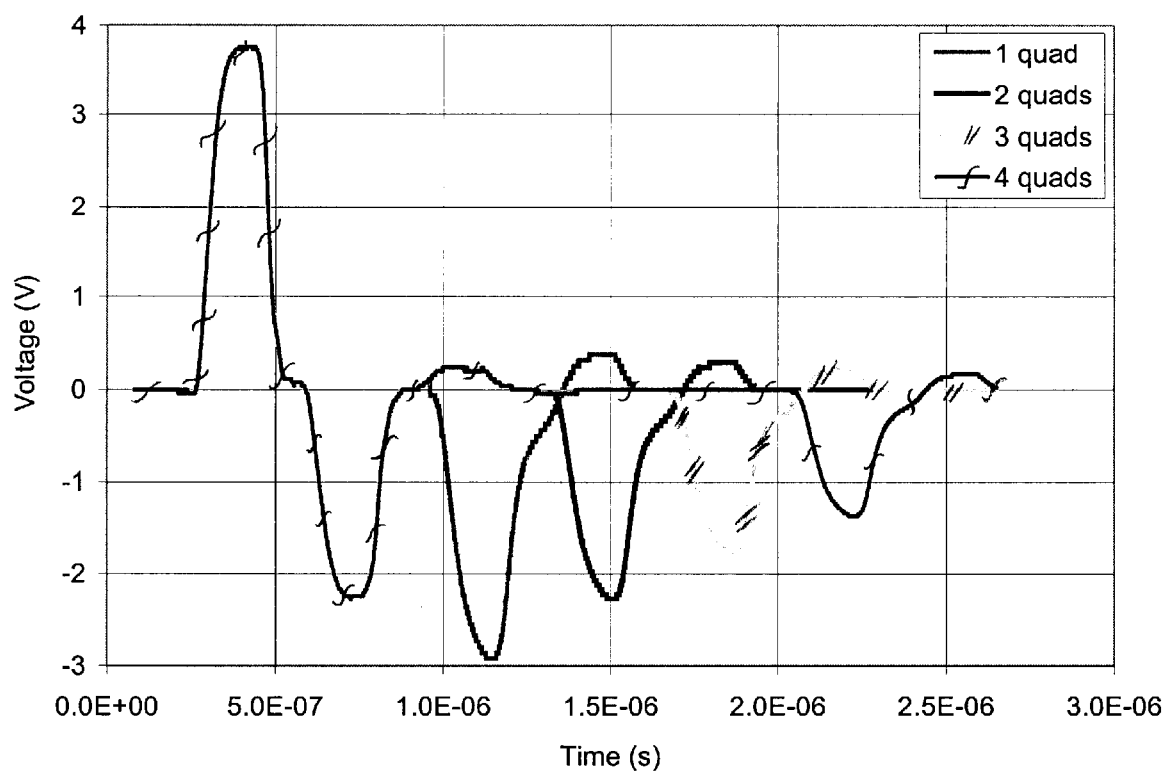
FIG. 14 is a graphical plot of voltage versus time illustrating exemplary traces of a high voltage pulse test.

FIG. 14 illustrates an exemplary oscilloscope trace of successive quads as they are added to the pipeline. After each successive quad is welded into place, the signal from the bulkhead reduces in amplitude and moves further away from the output pulse of the high voltage pulse generator. The time taken for a signal to travel along one quad and back is approximately 360 nanoseconds; therefore, the bulkhead reflection moves across the x-axis for this time interval after each quad is welded into place. FIG. 14 illustrates four different exemplary traces, Curves 1, 2, 3 and 4, that may occur as the first four quads are added to the pipeline.

As more and more quads are added to the pipe-in-pipe pipeline, larger time base settings and greater sensitivity on the oscilloscope may be required to better observe the reflected signal from the pipeline. Moreover, the oscilloscope may be used to "zoom in" on particular areas of the trace by decreasing the time base and increasing the sensitivity options of the oscilloscope.

EXAMPLE 3

Figure 15:
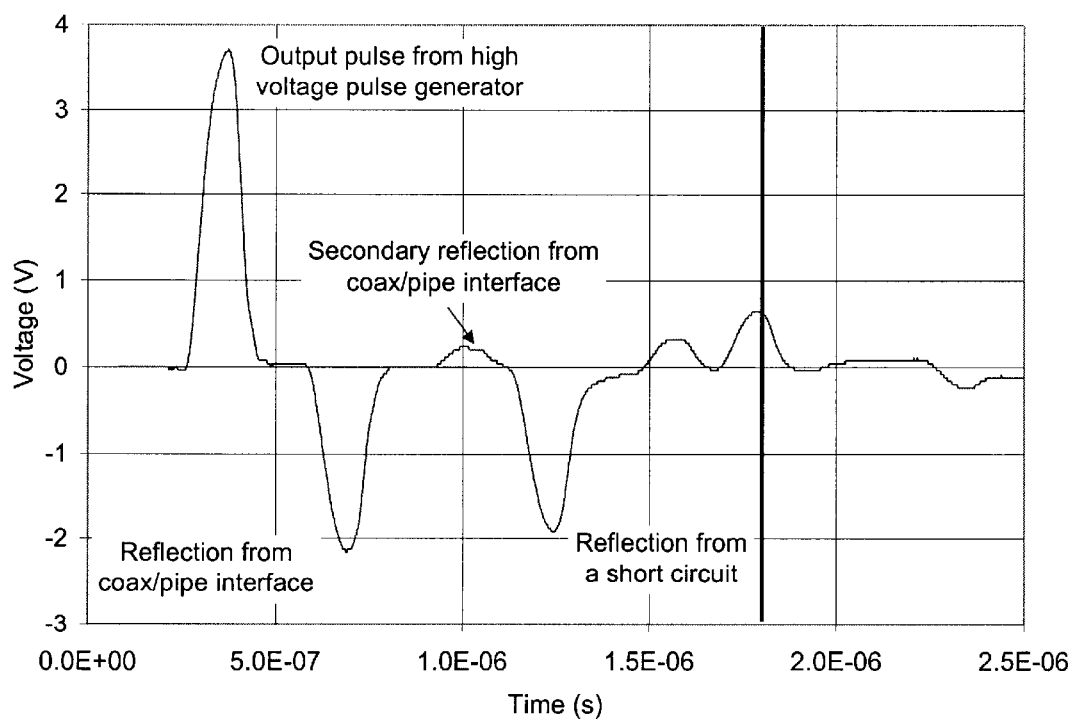
FIG. 15 is a graphical plot of voltage versus time illustrating an exemplary trace of a high voltage pulse test.

FIG. 15 shows the effect of a short circuit on the trace from the oscilloscope, which, absent the short circuit, would have been nearly identical to that shown in FIG. 12. The vertical black line in FIG. 15 indicates the location where the bulkhead reflection should have been before the short circuit was introduced. The reflections after the short circuit signal result from impedance differentials between the high voltage cable and the pipeline and the output impedance of the high voltage pulse generator.

EXAMPLE 4

Figure 16:
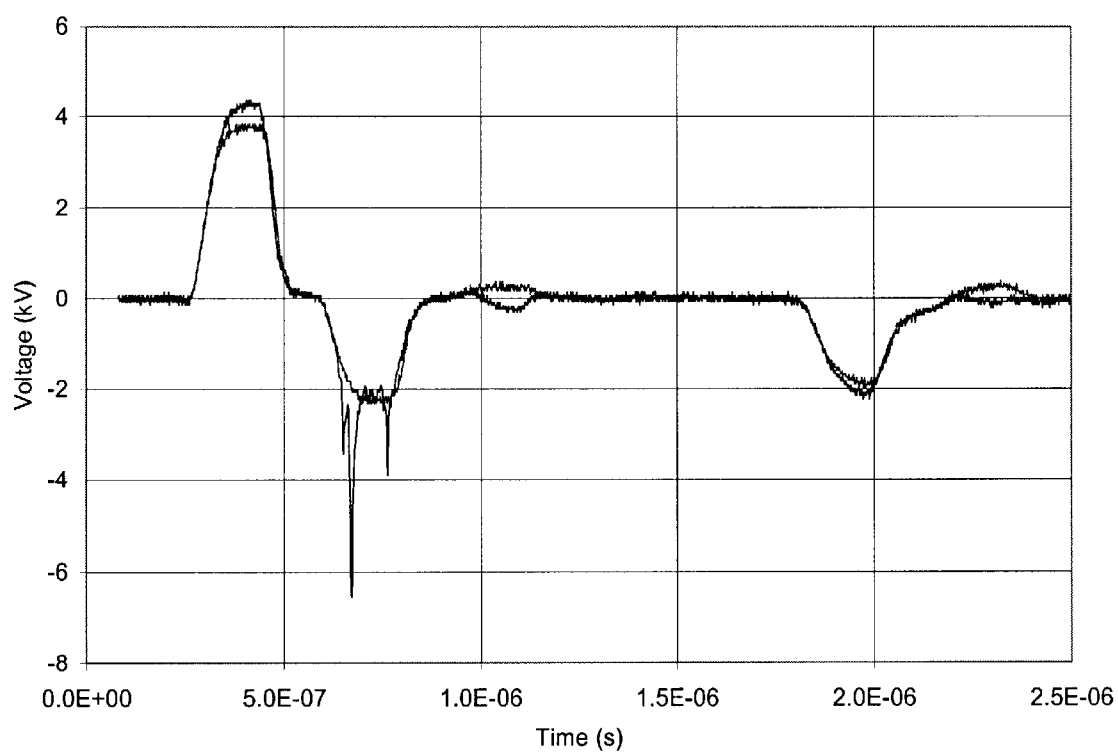
FIG. 16 is a graphical plot of voltage versus time illustrating exemplary traces of a high voltage pulse test.

FIG. 16 shows the effect on the oscilloscope trace of an arcing event. Metallic or water contamination within the annulus results in a discharge between the inner and outer pipe and produces spikes on the oscilloscope trace, as illustrated in FIG. 16. FIG. 16 shows that even though arcing is occurring, the reflected signal from the bulkhead is visible. However, it is possible that an arc is so large that no further signals are observed.

A cause of a short circuit may be either metallic contact between the inner and outer pipe or saltwater entry into the annulus. Short circuits produce a negative pulse not unlike the pulse produced by the bulkhead. The farther away the short circuit occurs the smaller its signal amplitude will be, due to attenuation in the pipeline. A short circuit may be indicated if a pulse appears before the time expected for the bulkhead (the reflected signal from the bulkhead will move by approximately 360 nanoseconds for each quad added to the pipeline).

EXAMPLE 5

If a pulse appears before the expected signal from the bulkhead, its distance from the start of the pipeline may be approximated. The time between the start of the pulse from the cable/pipeline interface and the start of the pulse of interest (using the cursor function on the oscilloscope) may be measured and the formula below may be applied to estimate the distance to the fault.

Distance (in meters)=140902455×time between pulses (in seconds)

Distance (in feet)=462278396×time between pulses (in seconds)

For example, if a reflected pulse appears 1650 nanoseconds away from the start of the pipeline, then the physical origin of the reflected pulse that appears may be about 232.5 meters (763 ft) away.

EXAMPLE 6

Figure 17A:
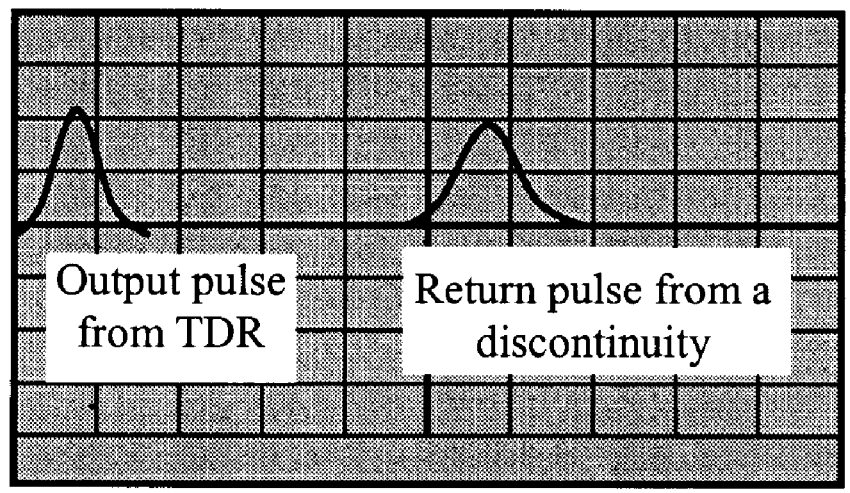
FIG. 17A is a graphical plot illustrating an exemplary trace of a low voltage pulse test.
Figure 17B:
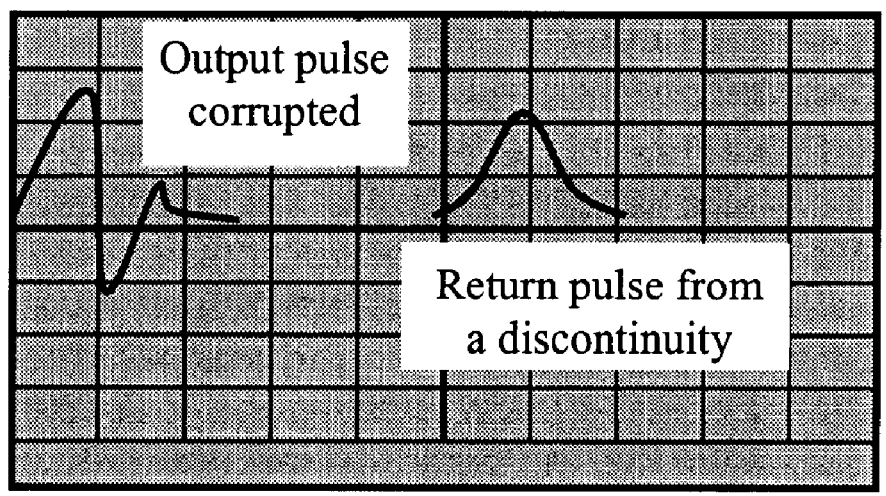
FIG. 17B is a graphical plot illustrating an exemplary trace of a low voltage pulse test.

FIG. 17A shows a typical waveform observed from a time domain reflectometer showing both the output pulse from the time domain reflectometer and a returning signal from a single discontinuity within the pipe-in-pipe pipeline. FIG. 17B shows an output pulse corrupted by a reflected signal close to the time domain reflectometer. A characteristic in the pipeline may generate a lower impedance, which may reflect a pulse with a reversed sign.

While particular embodiments of the present invention have been described, it is not intended that these details should be regarded as limitations on the present invention, except to the extent that they are included in the appended claims. It should be understood that various changes, substitutions and alterations can be made hereto without departing from the spirit and the scope of the invention as defined by the appended claims.

I claim:

1. A method for high-voltage qualification testing of electrical integrity of a segment of a pipe-in-pipe pipeline, comprising the steps of:

(a) providing the segment of the pipe-in-pipe pipeline, the segment having an outer pipe and an inner pipe;

(b) electrically connecting a power supply to the inner pipe;

(c) electrically connecting a return lead from the outer pipe to the power supply;

(d) applying a voltage from the power supply to the pipe-in-pipe pipeline; and (e) measuring a resulting electrical current.

2. The method of claim 1 wherein the segment has an operating voltage and the voltage applied to the pipe-in-pipe pipeline is greater than the operating voltage.

3. The method of claim 1 wherein the voltage is applied for a duration of time greater than about 1 second.

4. The method of claim 1 wherein the voltage applied is greater than about 3,000 volts.

5. The method of claim 1 wherein the voltage applied is greater than about 15,000 volts.

* * * * *